(12) United States Patent
    Cahill (10) Patent No.: US 10,148,383 B2
(45) Date of Patent: *Dec. 4, 2018

(54) OPTICAL CHANNEL MONITOR WITH INTEGRAL OPTICAL SWITCH

(71) Applicant: II-VI INCORPORATED, Saxonburg, PA (US)

(72) Inventor: Michael Cahill, Dedham, MA (US)

(73) Assignee: II-VI INCORPORATED, Saxonburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/456,660

(22) Filed: Mar. 13, 2017

(65) Prior Publication Data
    US 2017/0187484 A1    Jun. 29, 2017

Related U.S. Application Data

(63) Continuation-in-part of application No. 14/754,827, filed on Jun. 30, 2015, now Pat. No. 9,628,174.

(51) Int. Cl.
    *H04J 14/02*    (2006.01)
    *H04Q 11/00*    (2006.01)
    *H04B 10/079*   (2013.01)

(52) U.S. Cl.
    CPC .... *H04J 14/0221* (2013.01); *H04B 10/07955* (2013.01); *H04B 10/07957* (2013.01); *H04J 14/0227* (2013.01); *H04Q 11/0005* (2013.01); *H04Q 11/0066* (2013.01); *H04Q 2011/0009* (2013.01); *H04Q 2011/0039* (2013.01); *H04Q 2011/0041* (2013.01); *H04Q 2011/0083* (2013.01)

(58) Field of Classification Search
    CPC combination set(s) only.
    See application file for complete search history.

(56) References Cited

U.S. PATENT DOCUMENTS

| 6,310,703 | B1 * | 10/2001 | Alavie | ........ H04B 10/077 398/34 |
|---|---|---|---|---|
| 6,407,376 | B1 | 6/2002 | Kom et al. | |
| 6,529,316 | B1 | 3/2003 | Treyz et al. | |
| 6,754,415 | B2 | 6/2004 | Shin et al. | |
| 6,798,941 | B2 | 9/2004 | Smith et al. | |

(Continued)

*Primary Examiner* — David Payne
*Assistant Examiner* — Omar S Ismail
(74) *Attorney, Agent, or Firm* — Wendy W. Koba (57) ABSTRACT

A multiport optical switch is used to controllably select a specific incoming optical signal that is to be processed by an associated optical channel monitor (OCM). The OCM includes a tunable optical filter and photodetector arrangement, and is configured to measure the optical spectrum of the incoming optical signal and extract information associated with the various optical channels forming the incoming optical signal (i.e., power, wavelength, OSNR, etc., per channel in the signal). The OCM also includes a processor that generates a pair of output control signals, a first signal to control the wavelength scanning process of the tunable optical filter and a second signal to control the setting of the multiport optical switch. The second signal may also be used to perform "detuning" of a selected input of the multiport optical switch, providing the ability to adjust the power level of an input signal prior to entering the OCM.

11 Claims, 7 Drawing Sheets

(56) References Cited

U.S. PATENT DOCUMENTS

| | | |
|---|---|---|
| 7,263,253 B2 | 8/2007 | Davis et al. |
| 7,756,368 B2 | 7/2010 | Garrett et al. |
| 8,606,119 B2 | 12/2013 | DeAndrea |
| 8,755,651 B2 | 6/2014 | Wu et al. |
| 8,995,828 B2 | 3/2015 | Suzuki |
| 9,083,459 B2 | 7/2015 | Oda |
| 9,154,227 B2 | 10/2015 | Ohtani |
| 2004/0096212 A1 | 5/2004 | McLeod et al. |
| 2010/0221004 A1 | 9/2010 | Haslam et al. |
| 2013/0243424 A1 | 9/2013 | Shukunami |
| 2014/0212133 A1 | 7/2014 | Kobayashi et al. |
| 2015/0155934 A1* | 6/2015 | Nakagawa ......... H04B 10/0775 398/34 |

\* cited by examiner

FIG. 3
LOW GAIN

(a)

(b)

FIG. 4
HIGH GAIN (a)

OPTICAL CHANNEL MONITOR WITH INTEGRAL OPTICAL SWITCH

CROSS-REFERENCE TO RELATED APPLICATION

This application is a continuation-in-part of U.S. application Ser. No. 14/754,827, filed Jun. 30, 2015, which is herein incorporated by reference.

TECHNICAL FIELD

The present invention relates to optical channel monitors (OCMs) and, more particularly, to an OCM that incorporates optical switching functionality for use in multiport optical monitoring applications.

BACKGROUND

Optical networks are found in a wide variety of high speed applications, and used to provide efficient transmission of voice, video and data signals. Some optical networks implement wavelength division multiplexing (WDM) to increase network bandwidth. In WDM optical networks, multiple optical channels occupying distinct wavelengths/frequencies are multiplexed into a single optical signal for transmission through a single optical fiber.

Error rates in long-haul WDM optical networks depend on, among other things, per channel optical power and optical signal-to-noise ratio (OSNR) values. Modules such as optical amplifiers have been found to degrade the OSNR, as well as produce power ripple across the optical band for the transmission channels. To remedy these problems, WDM optical networks often implement systems that perform optical channel power monitoring and/or optical channel power correction to maintain optimal channel powers and desired low error rates.

Various types of optical channel monitors (OCMs) have been developed to perform these functions, and in general are configured to measure the multiple wavelengths used within a WDM network, with OCMs disposed at various locations throughout the network. The power level of each optical channel may be reported in real time, with feedback from the OCM to a "host" (such as a Network Management System (NMS)) utilized to optimize the optical power level for each channel, identify performance drift, and verify system functionality.

More complex networks may use dense WDM (DWDM) systems, which support the communication of a large number of separate optical fibers (ports), each port supporting multiple optical channels. Monitoring equipment for these DWDM systems becomes increasingly expensive and time-consuming to use, requiring multiple measurements of each signal as they pass through many optical elements in the system. Additionally, one or more of the signals appearing at a monitoring arrangement may be of relatively low power, making it difficult to accurately measure the signal level in the presence of the noise created within the measurement system itself.

SUMMARY OF THE INVENTION

The present invention relates to an optical channel monitor that incorporates optical switching functionality to allow for controlled monitoring of a set of separate optical fibers (ports) in a WDM system.

In accordance with the present invention, a multiport optical switch (such as an N×1 switch) is used to controllably select a specific incoming optical signal that is to be processed by an included optical channel monitor (OCM). The OCM includes a tunable optical filter and photodetector arrangement, and is configured to measure the optical spectrum of the incoming optical signal and extract information associated with the various optical channels (wavelengths) forming the incoming optical signal (i.e., power, wavelength, OSNR and the like for each channel). The OCM includes a processor component to perform this information extraction, and also generates a pair of output control signals, a first signal to control the wavelength scanning process of the tunable optical filter and a second signal to control the setting of the multiport optical switch.

In one embodiment of the present invention, the processor component controls the optical switch to optically block all input ports from the output port (i.e., creating a "dark" channel input to the OCM). The dark channel input is used to measure a real-time level of offsets and noise in the OCM electronics and thus provide a baseline noise factor that can be used to correct subsequent monitoring operations and provide accurate measurements of the power of each channel, particularly useful in low power conditions.

In yet another embodiment of the present invention, a separate wavelength reference source is included at a selected optical switch input port and is used to perform self-recalibration of the OCM, as necessary, to overcome wavelength drift that may have occurred within the tunable filter.

In particular, the utilization of the single processor component to control the operation of both the multiport optical switch and the tunable filter allows for several different maintenance/calibration operations to be performed. For example, besides wavelength drift correction, the processor component can be used to monitor the output power level from the tunable filter and provide realignment control signals to the tunable filter. Similarly, the alignment between the input and output ports of the multiport switch can be monitored and a feedback (control) signal used to re-orient one or more of the signal paths as necessary to provide optimum coupling between a selected input port and the output port.

In one particular embodiment, the present invention takes the form of optical channel monitoring system including the following elements: (1) a multiport optical switch including a plurality of input ports and a single output port, each input port receiving an optical input signal (each optical input signal including one or more individual wavelength channels), with the multiport optical switch controlled to selectively couple one input port from the plurality of input ports to the output port; (2) a tunable optical filter coupled to the output port of the multiport optical switch and responsive to the optical input signal, the tunable optical filter configured to selectively pass separate wavelength channels at different points in time; (3) an optical photodetector coupled to the output of the tunable optical filter for converting each separate wavelength channel into an electrical signal equivalent; and (4) a processor component responsive to the electrical signal for extracting optical characteristic data used to monitor the performance of the optical signal. The processor component is further configured to generate a first control signal applied as an input to the multiport switch to control the input port selection, and a second control signal applied as an input to the tunable optical filter to control the wavelength channel selection.

Yet another embodiment of the present invention relates to a method of controlling an optical channel monitoring process in a multiport environment, the method including the steps of: a) providing a multiport optical switch at an input of an optical channel monitor, the multiport optical switch including a plurality of input ports for receiving a plurality of different optical signals and a single output port; b) controlling the multiport optical switch to couple a selected input port to the output port; c) applying the selected optical signal to the input of the optical channel monitor; d) selecting a center wavelength of a tunable optical filter within the optical channel monitor; e) measuring optical power at the selected center wavelength within the selected optical signal; f) repeating steps d) and e) to measure optical power at a set of wavelength channels within the selected optical signal; g) controlling the multiport optical switch to couple a different input port to the output port; and h) repeating steps b)-g) for one or more input ports of the multiport optical switch.

An alternative embodiment of the present invention utilizes the multiport optical switch as an attenuator by providing "detuning" of a selected input port, enabling the optical channel monitor to support a wide range of input powers.

Other and further embodiments and features of the present invention will become apparent during the course of the following discussion and by reference to the accompanying drawings.

BRIEF DESCRIPTION OF DRAWINGS

Referring now to the drawings, where like numerals represent like parts in several views.

DETAILED DESCRIPTION

Figure 1:
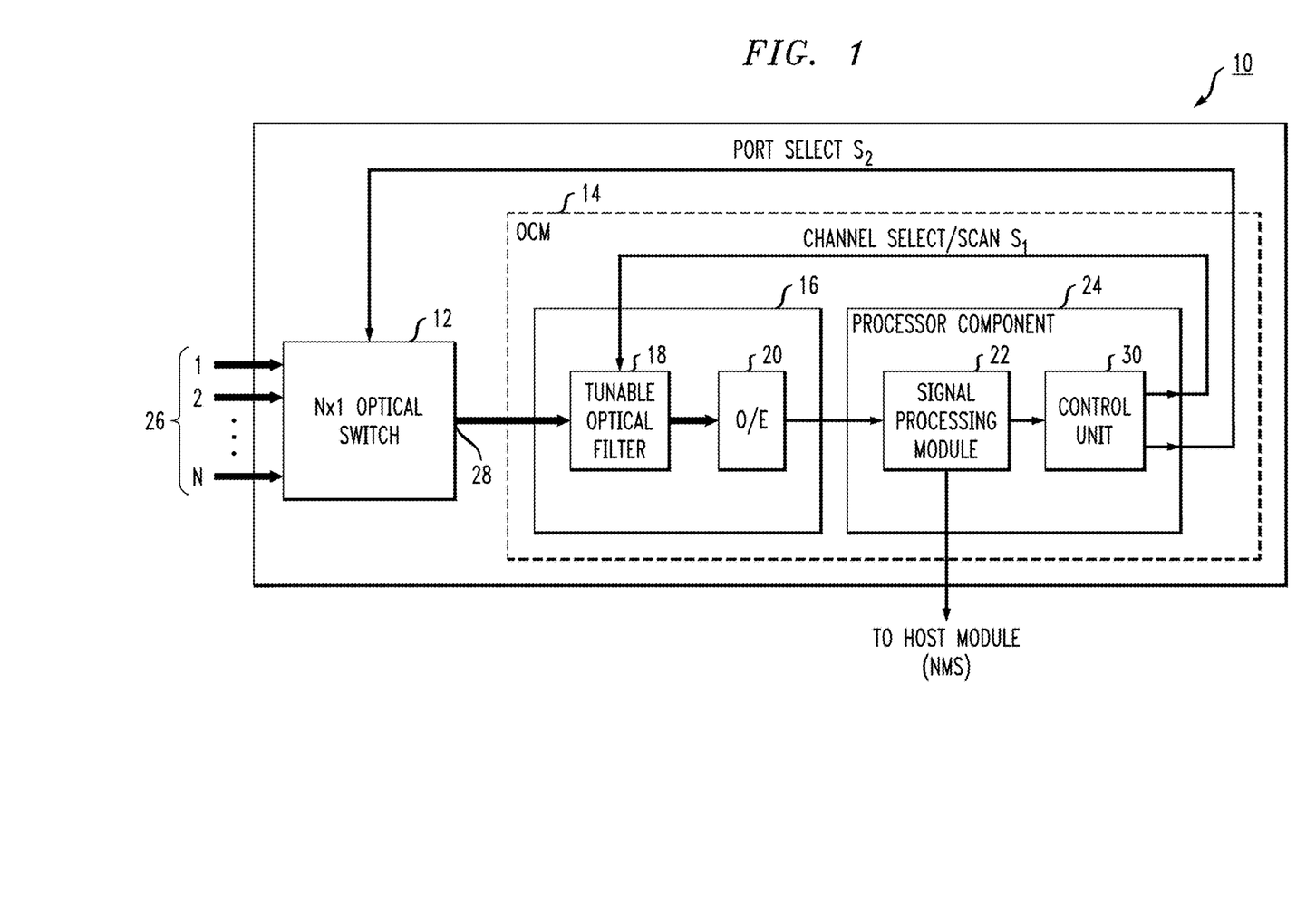
FIG. 1 illustrates an exemplary optical channel monitor (OCM) incorporating an optical switch in accordance with the present invention.

FIG. 1 illustrates an exemplary optical channel monitoring system 10 formed in accordance with the present invention, which incorporates a multiport optical switch 12 at the input of an optical channel monitor (OCM) 14, enabling efficient performance of the OCM in more complex optical networks, such as those supporting DWDM and using multiple optical signal paths. OCM 14 is shown as comprising a first module 16 that functions to receive an incoming optical signal and provide an electrical output signal representative of the optical signal. The incoming optical signal is considered to be supporting the propagation of multiple optical channels, each operating at a different wavelength. First module 16 includes a tunable optical filter 18 that receives the incoming optical signal and scans across a predetermined wavelength range of interest for the set of channels associated with that signal (or, perhaps, is adjustably centered on specific wavelength(s) associated with a presented optical signal—perhaps 'dwelling' on a particular wavelength if there are notable problems/errors associated with that channel).

The optical output signal from tunable filter 18 is then applied as an input to a photodiode 20 (or another suitable type of photodetection device) to transform the optical signal into an equivalent electrical representation. The electrical signal takes the form of a raw data spectrum, which is then applied as an electrical signal input to a signal processing module 22 within a processor component 24. In accordance with the conventional operation of an optical channel monitor, signal processing module 22 is used to analyze this raw data spectrum and ascertain selected characteristics of the associated optical signal (e.g., power, level, wavelength OSNR, etc. of each separate channel contained within the incoming optical signal). OCM 14 then provides this information as an output information signal to a host module, typically a network management system (NMS), for use in controlling/correcting the characteristics of each individual channel.

The system of the present invention enhances the operation of a conventional OCM by incorporating multiport optical switch 12 at the input of OCM 14 and utilizing processor component 24 to control the operation of both switch 12 and OCM 14 in a manner that allows for an improved efficiency in the monitoring process.

There are a variety of different configurations of a multiport optical switch, and various ones of these configurations may be used in the arrangement of the present invention. In general, optical switch 12 takes the form of an N×1 optical switch, with a plurality of N input signal ports 26, for receiving a plurality of N optical signals propagating within the communication system, and a single output port 28. Optical switch 12 is controlled to couple a selected one of input ports 26 to output port 28. The optical signal exiting at output port 28 is then presented as the optical signal to be monitored at the input to OCM 14. OCM 14 then functions in a conventional manner as described above to perform optical spectrum measurements of each channel within first module 16 and extract pertinent information regarding the performance of each channel from this spectral data within signal processing module 22 of processor component 24.

As shown in FIG. 1, processor component 24 of OCM 14 also includes a control unit 30. In accordance with the present invention, control unit 30 is in communication with signal processing module 22 and is used to generate two output control signals, one for controlling the operation of tunable optical filter 18 and another for controlling the operation of multiport optical switch 12. In a preferred embodiment of the present invention, control unit 30 is configured such that these two output control signals operate in a synchronous manner such that both switch 12 and filter 18 change state at the same time.

Referring to FIG. 1, control unit 30 is shown as generating a "channel select" (or "channel scan") control signal $S_1$ that is applied as a control input to tunable optical filter 18, and a "port select" control signal $S_2$ that is applied as a control input to multiport optical switch 12. Control signal $S_1$ directs the specific operation of tunable optical filter 18 to scan through a particular set of wavelength channels contained within the optical signal appearing at the input to filter 18. As the filter controls the various wavelength components passing through, photodiode 20 then converts the received signal power at each channel into an electronic signal for further analysis within signal processing module 22 (i.e., measurements of center wavelength, signal power, OSNR, etc.). This information may be stored within a database included within processor component 24 (not shown) and/or sent to a host unit (such as a network monitoring system (NMS)) for additional study.

Once a monitoring operation of a given port is completed, control unit 30 sends a "port select" signal $S_2$ to optical switch 12, instructing switch 12 select another input port for monitoring. In particular, the "port select" signal $S_2$ instructs multiport optical switch 12 to be re-configured such that another input port is coupled to output port 28 of optical switch 12. In accordance with the present invention, control unit 30 is configured to also transmit a "channel select" control signal $S_1$ to tunable filter 18 upon the selection of a new input port at optical switch 12, instructing filter 18 to initiate a new scan/select for a set of wavelengths associated with the channels within the 'new' signal now appearing at its input. In a preferred embodiment, control signals $S_1$ and $S_2$ operate in a synchronous manner to reduce latency and improve the operation efficiency in the multiport OCM environment.

Advantageously, the use of a single component (i.e., processor component 24) to control the operation of both optical switch 12 and OCM 14 allows for the sharing of computing resources for these two functions, which would otherwise require their own processing functionalities, adding size, complexity and expense to the overall monitoring system. Indeed, by utilizing the monitoring analysis performed by signal processing module 22 of OCM 14, control unit 30 can control the operation of optical switch 12 so as to "dwell" on a specific port that may be experiencing problems and allow for continuous measurements to be made for this port over a longer period of time. Alternatively, control unit 30 can control the operation of optical switch 12 so as to monitor some ports more regularly than other ports, based on information received from (for example) the NMS.

In a preferred embodiment of the present invention, signals $S_1$ and $S_2$ are synchronized so that optical switch 12 moves from one selected port to another in a manner that is synchronous with the re-setting of the center wavelength of tunable filter 18. In this case, the latency between these other unsynchronized events is minimized, while also maximizing the multi-port monitoring capability of OCM 14.

As mentioned above, the utilization of a single processor component in conjunction with both an OCM and multiport switch provides a feedback arrangement that allows for the operational characteristics of the multiport switch and tunable optical filter to be monitored and re-calibrated and/or adjusted as necessary. For example, as will be discussed in detail below, wavelength drift within the tunable filter can be recognized and the control signal input used to re-set the wavelength to the proper, nominal value. The same system can be used to optimize the output power from the tunable filter by ensuring that optical alignment between the input and output signal paths is maintained. Similarly, it is also possible to utilize the processor component of the present invention to monitor the performance of the multiport switch (in terms of output power efficiency) and utilize the feedback control signal to realign various switch elements, as necessary to re-align optical signal paths and provide optimum output power level from the multiport switch.

Figure 2:
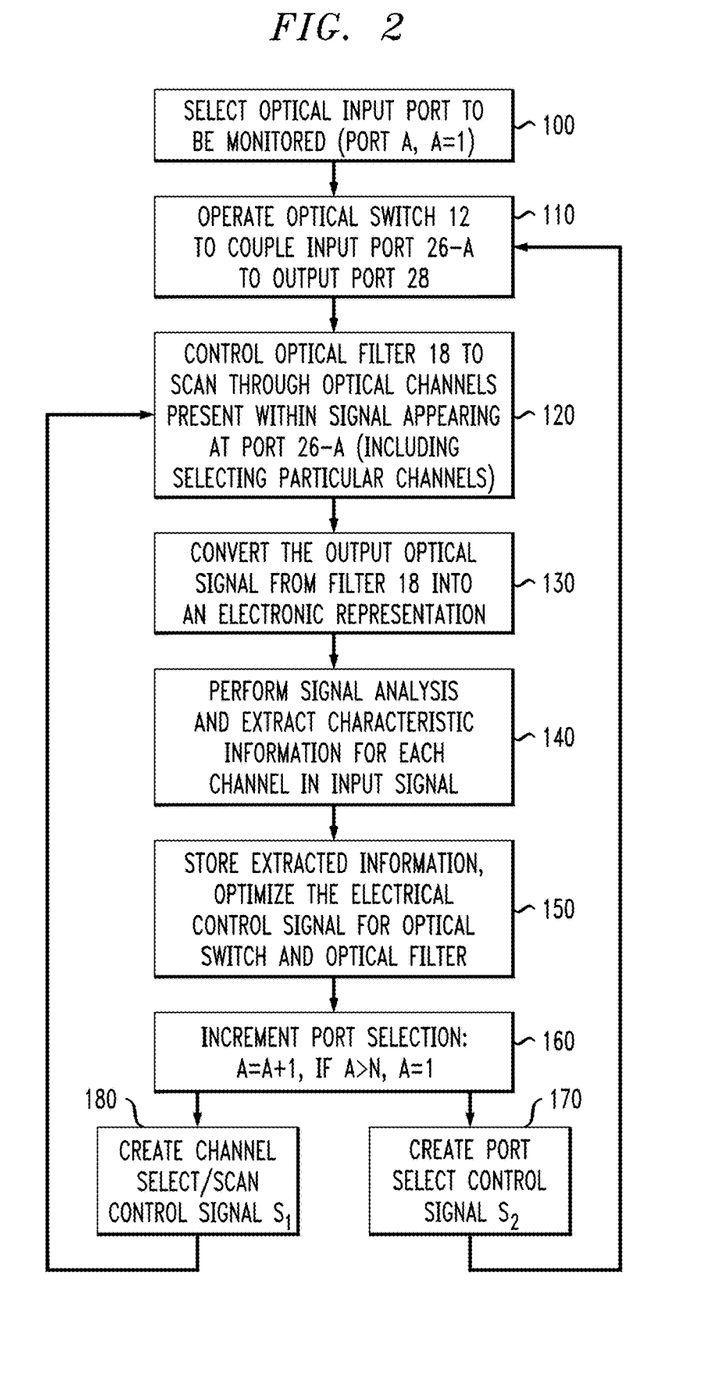
FIG. 2 is a flowchart illustrating an exemplary set of process steps that may be utilized to perform optical channel monitoring with the arrangement of FIG. 1.

FIG. 2 is a flowchart illustrating the operation of optical channel monitoring system 10 of FIG. 1. The process begins at step 100 with a specific port being selected for monitoring (in this case, designated as "port A" and starting with the value A=1). At step 110, optical switch 12 is operated to couple the specific input port 26-A to output port 28, thus providing an input optical signal for monitoring operations as the input to OCM 14. Optical filtering is then performed on this optical signal (shown as step 120 in FIG. 2), where tunable optical filter 18 is scanned across the spectrum of interest (or centered on a predetermined wavelength/channel) as controlled by channel scan/select control signal $S_1$. The next operation is shown in step 130 as converting the filtered optical signal into an electronic representation. An analysis of the electrical signal is then performed (step 140) to extract information such as power, wavelength and OSNR of the original optical signal. This information may then be stored in processor component 24 and/or sent to a host module for further analysis (step 150), as well as calculating any required optimizations of the electrical control signal for the optical switch and the optical filter.

The process continues at step 160 by activating control unit 30 to create "increment port selection" signal. In particular, process continues with step 170 sending a "port select" control signal $S_2$ to optical switch 12 (shown as "increment port selection") and step 180 sending a "channel scan/select" control signal $S_1$ to tunable optical filter 18. The monitoring process then returns to step 110.

Optical channel monitoring system 10 of FIG. 1 is further capable of improving the accuracy of OCM 14 by using a "dark" input to OCM 14 to ascertain a background electronic offset and noise level and thereafter remove this baseline noise component from measured optical signals. That is, prior to performing monitoring of any of the channels appearing at input ports 26 of optical switch 12, control unit 30 sends an "off" control signal $S_2$ to optical switch 12. In response to this signal, optical switch 12 optically de-couples all input ports 26 from output port 28. As a result, no optical signal is applied as an input to OCM 14. Control unit 30 may also function to turn "off" tunable filter 18, thus bypassing the optical filtering properties of OCM 14 as well. In this condition, a "no-light" baseline value can be established by signal processing module 22 of OCM 14. Thereafter, this baseline amount of system noise is removed from measured optical signal values, improving the measurement accuracy of the optical signals, particularly low power optical signals.

The ability to perform this baseline measurement eliminates the need to introduce a front-end DC level, ensuring better low power performance. Additionally, this "dark" measurement also allows for system 10 to be self-recalibrated as needed at any point in time (due to changes in environmental conditions, component aging, etc.). That is, control unit 30 of processor component 24 can be configured to send the "no-light" control signals to both optical switch 12 and tunable filter 18 on a regular basis to perform an updated measurement of the baseline noise measurement, providing an efficient means of maintaining accurate results in the monitoring process.

Figure 3:
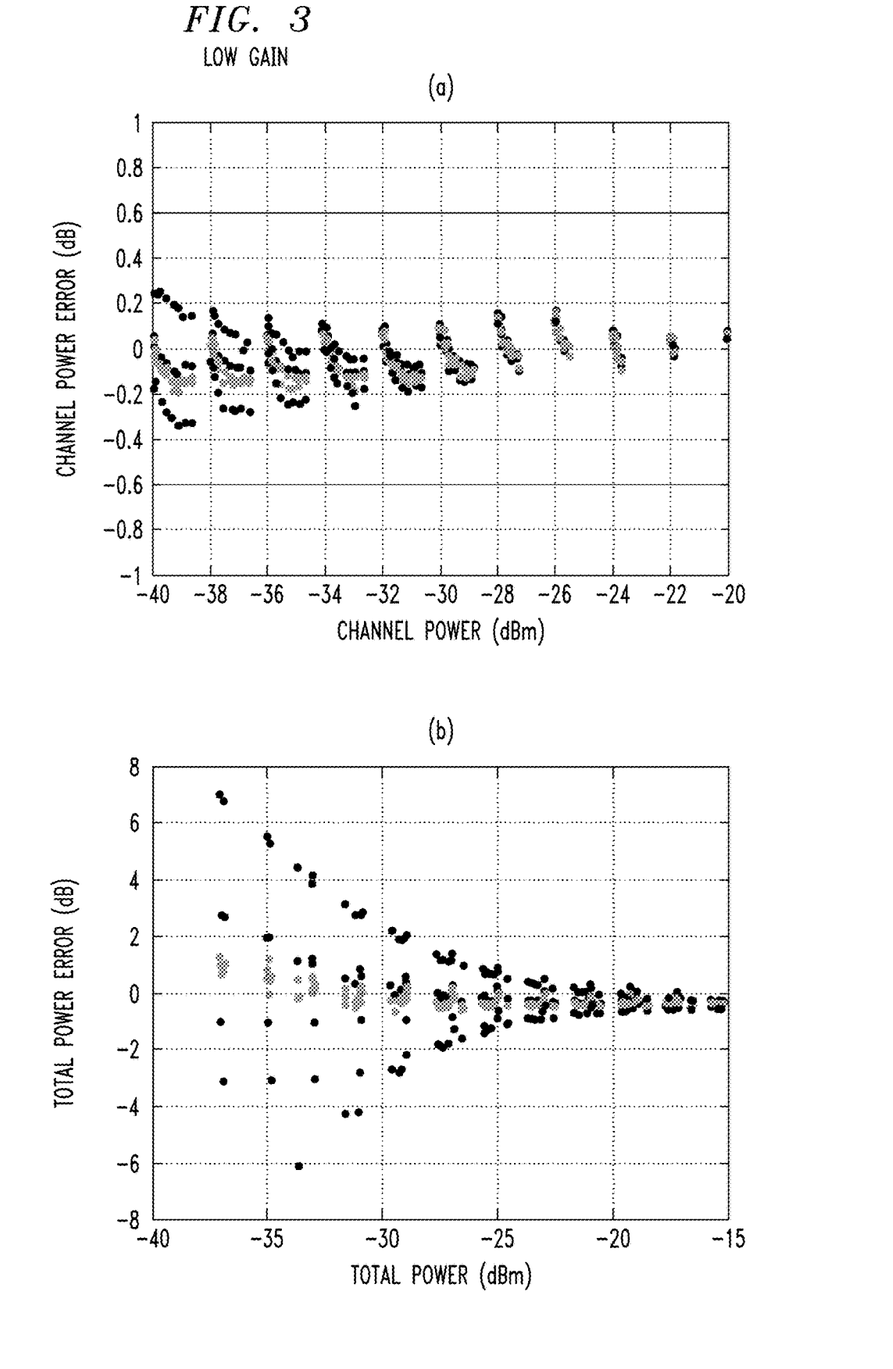
FIG. 3 contains plots of per-channel noise error (plot (a)) and total power noise error (plot (b)) for a "low gain" configuration.

FIG. 3 contains a pair of plots illustrating the improvement in performance when utilizing a noise correction factor, in this example associated with "low gain" conditions (channel power in the range of −20 to −40 dBm, and ASE power in range of −40 to −70 dBm). FIG. 3(a) is a plot of error present in channel power measurements, with an indication of typical specification bars at ±0.6 dB also shown. Both a non-corrected power error measurement dataset (shown as the darker set of points) and a corrected power error measurement dataset (lighter set of points) are plotted in FIG. 3(a). While both the non-corrected and corrected values are within the industry limits, it is clear that as the channel power decreases, the non-corrected values tend to spread out, while the corrected dataset values remain clustered near the zero value.

The difference between non-corrected and corrected power measurements is clearer in the total power measurements plotted in FIG. 3(b). Without providing any type of correction, it is evident that the non-corrected power measurements exhibit a quickly increasing amount of error, particularly as the total power goes below −30 dBm.

Figure 4:
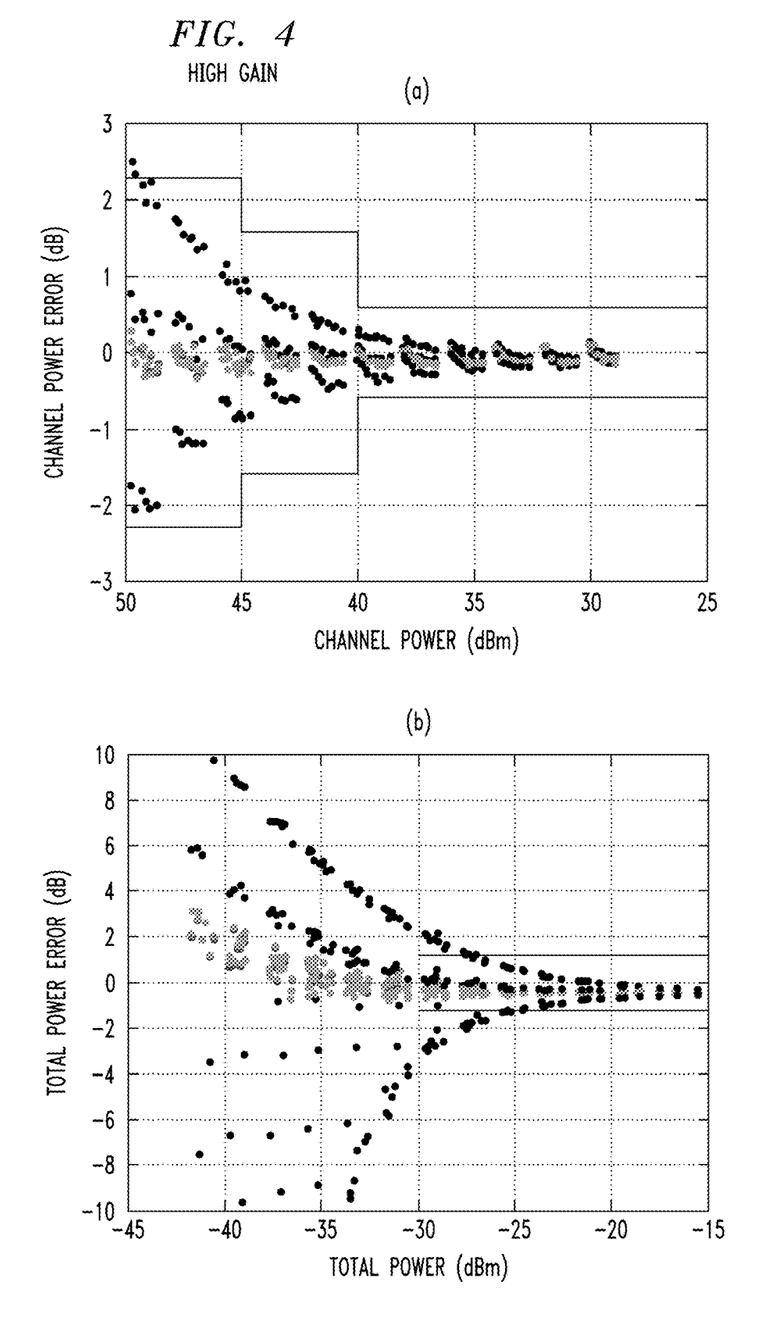
FIG. 4 contains plots of per-channel noise error (plot (a)) and total power noise error (plot (b)) for a "high gain" configuration.

FIGS. 4(a) and (b) contain plots similar to those of FIGS. 3(a) and (b), but in this case illustrate data associated with a "high gain" condition (channel power in range of −30 to −50 dBm, same ASE power). The improvement obtained by including the noise correction in the measurements is even more noticeable in this high gain environment.

Figure 5:
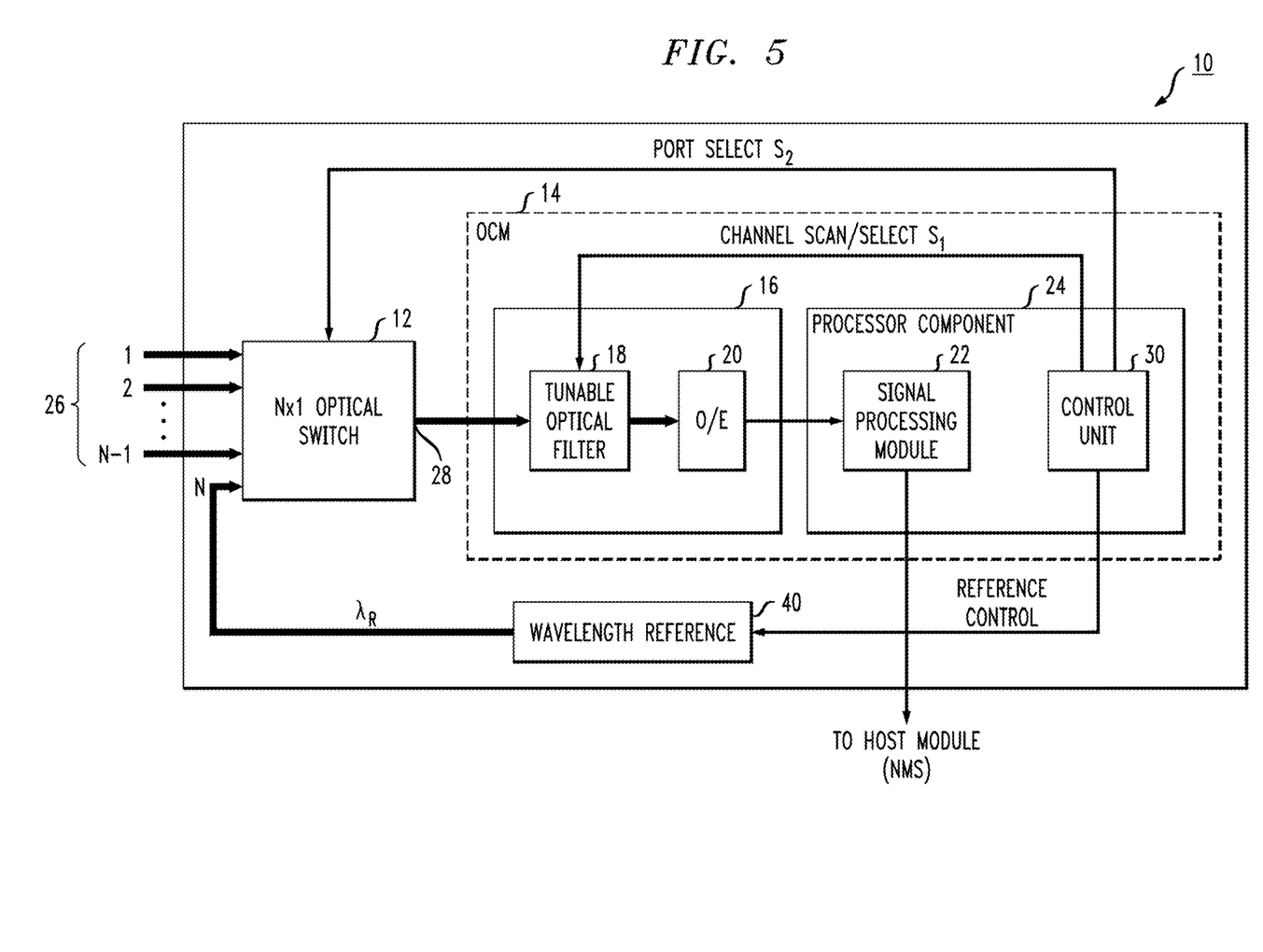
FIG. 5 illustrates an alternative OCM formed in accordance with the present invention, in this case also including a wavelength reference source.

FIG. 5 illustrates another embodiment of the present invention, in this case where a reference wavelength source 40 is included and used to check the accuracy of the measurement operations performed by OCM 14. In particular, wavelength source 40 provides OCM 14 with an input reference that can then be used to self-recalibrate over time, compensating for changes in the operating conditions and/or aging of the optical and electrical components forming element 16 of OCM 14.

Advantageously, the inclusion of multiport optical switch 12 at the input to OCM 14 in accordance with the present invention provides a simple access point for coupling reference source 40 into the system. By utilizing a dedicated input port (shown in this case as port N) on multiport optical switch 12h as the input for the reference wavelength signal, the design simplifies the optical components typically required to measure both the conventional input signals and an independent wavelength reference. As mentioned above, the utilization of a single processor component to control the operation of both OCM 14 and multiport optical switch 12 provides the ability to constantly monitor the operation of both elements and adjust/re-calibrate their operating parameters (such as, for example, power optimization). For example, multiport optical switch 12 can be recalibrated by comparing an optical power measurement for a given input port setting of the switch to a previous power measurement for that same port (the previous power measurements being stored in a memory element within processor component 24. If the current power measurement is too low, control unit 30 will send a "realignment" control signal to multiport switch 12 that initiates an optical realignment process within switch 12 to adjust the signal path between the given input port and the output port until maximum optical coupling is achieved. A similar power measurement process may be used between the input and output of tunable optical filter 18 to maximum optical coupling through the filter.

Figure 6:
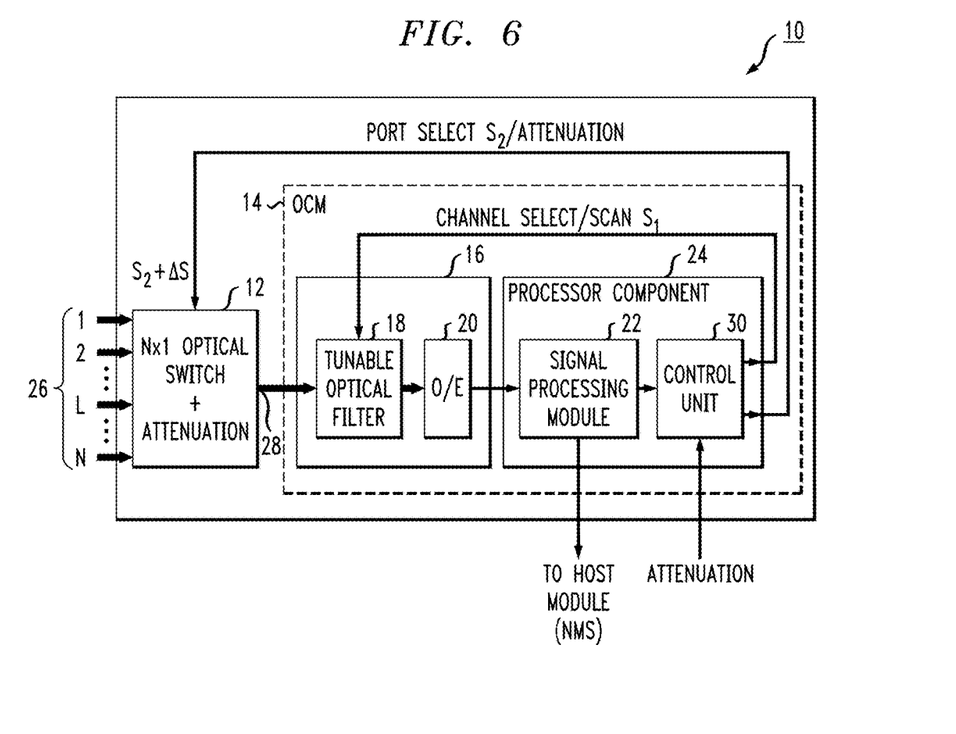
FIG. 6 illustrates yet another embodiment of the present invention, in this case configuring the port select switch with a detuning capability to provide attenuation (i.e., power control) for the signals applied as an input to the monitoring function.

As mentioned above, there may be instances where it is necessary to reduce the optical power present in a signal prior to its evaluation by an OCM. In conventional systems, a separate attenuation component (such as a variable optical attenuator, or VOA) would be used for this function. However, in accordance with the principles of the present invention, it is possible to utilize multiport switch 12 to provide this additional functionality. FIG. 6 illustrates an exemplary embodiment of the present invention where multiport switch 12 is further controlled via port selection signal S2 to control the power level of a signal that is being coupled to output port 28 of multiport switch 12.

In accordance with this embodiment of the present invention, control unit 30 is particularly configured to provide specific values of port select signal S2 other than the "discrete" values defined above used to select "one-out-of-N" input ports 26.

For example, presume that it is desired to attenuate the power level of the signal appearing at input port L of multiport switch 12. The need to attenuate this signal level may have been determined via a separate analysis, or as a result of the monitoring function described above. In the particular configuration as shown in FIG. 6, an external attenuation control signal is applied as an input to control unit 30, which is used to create an "attenuation mode" for port select signal S2, shown in FIG. 6 as "S2+ΔS".

In the case where it is desired to attenuate the power level of the optical signal present at input port L (for example) prior to presenting this signal as an input to the remainder of the OCM components (i.e., tunable optical fiber 18, O/E component 20, and the like), the "attenuation mode" port selection switch takes the form of "$S2_L + \Delta S2_{L,x\ dB}$", where "x" is the desired attenuation for port L. The ΔS2 factor denotes the slight shift in switch connection signal that imparts a slight shift in the coupling between input port L and output port 28. Also referred to as "detuning", this attenuation mode of port selection switch 12 is thus able to control (attenuate) the power level of any signal thereafter applied as an input to tunable optical filter 18.

In one exemplary configuration of this embodiment of the present invention, multiport optical switch 12 is embodied as a MEMS-based switch, allowing for the "detuning" to be achieved by slightly altering the voltage applied to the change the position of the mirror(s) involved in the switch process, where the alteration in the mirror angle is associated with the amount of detuning (attenuation) that is achieved.

Figure 7:
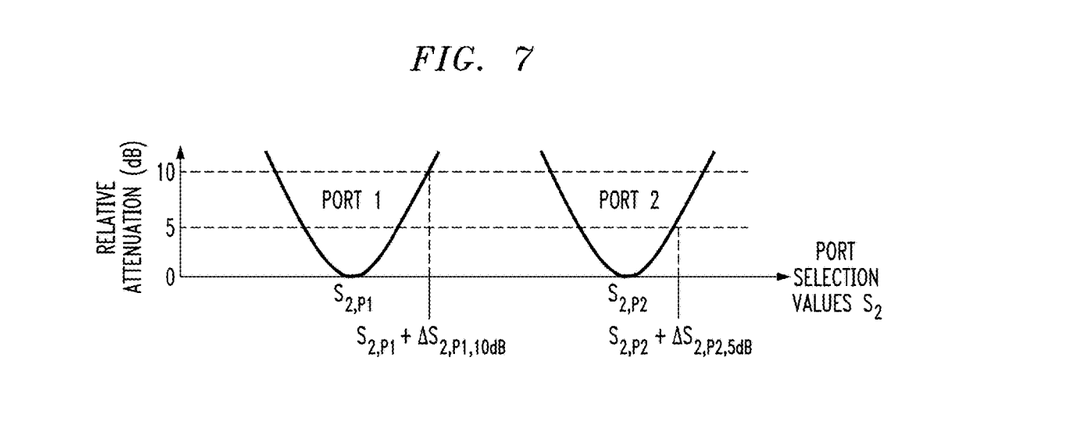
FIG. 7 is a graph depicting the attenuation range associated with the embodiment shown in FIG. 6.

FIG. 7 contains a graph depicting the operation of multiport optical switch 12 as an attenuator. The graph illustrates the relative attenuation present at a specific port as a function of the value of port select signal S2. When port select signal S2 is set to the value $S2_{P1}$, then the signal from input port P1 is passed to output port 28 without attenuation (as in the previous embodiments).

Now, in accordance with the attenuator embodiment of the present invention, if port select signal S2 is set to the value $S2_{P1,\ 10\ dB}$, then the signal appearing at input port P1 is attenuated by 10 dB by the time it reaches output port 28. Another example shown in the graphs of FIG. 7 shows setting the value of port select signal S2 to $S2_{P2,\ 5\ dB}$. As a result of this setting for S2, the signal appearing at input port P2 of multiport optical switch 12 will be attenuated by 5 dB prior to reaching output port 28. The ability to add this attenuation feature to the operation of the inventive OCM enables the module to support a wider range of input powers, thus further enhancing its utility in an optical network.

Figure 8:
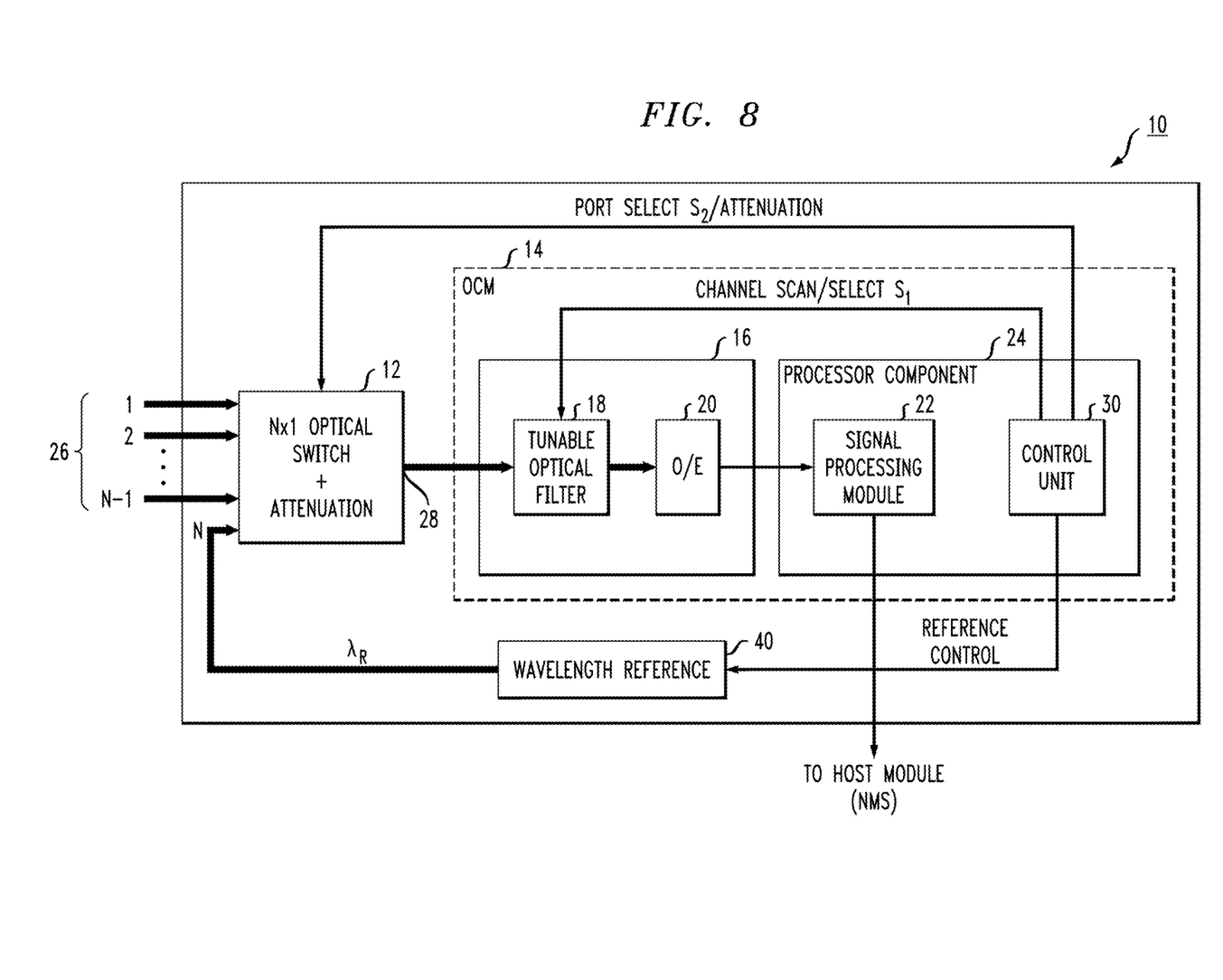
FIG. 8 illustrates another configuration of the embodiment of FIG. 6, in this case utilizing a reference wavelength source to provide calibration for the attenuation adjustments provided by the port select switch.

FIG. 8 illustrates the utilization of the calibration feature of the present invention with the attenuation capabilities described above. In particular, switch calibration is used in this specific case of also providing attenuation to determine the relationship between the port selection signal and the specific amount of attenuation (which may be the same or different for each individual port). Particularly in the case of devices that may change their characteristics over time, wavelength reference 40 can be used to provide in-situ attenuation calibration. For example, a particular dB level of attenuation can be mapped for the wavelength reference port, and then any changes from this initial calibration can be applied to all ports.

While this invention was been particularly shown and described with references to preferred embodiments thereof, it will be understood by those skilled in the art that various changes in form and details may be made therein without departing from the scope of the invention as encompassed by the claims appended hereto.

What is claimed is:

1. An optical channel monitoring system comprising:
   a multiport optical switch including a plurality of input ports and a single output port, each input port receiving a separate optical input signal, with each separate optical input signal including a plurality of separate wavelength channels, the multiport optical switch controlled to selectively couple one input port from the plurality of input ports to the single output port;
   a tunable optical filter coupled to the single output port of the multiport optical switch for receiving the selected optical input signal, the tunable optical filter controlled to selectively pass different wavelength channels at different points in time;
   an optical photodetector coupled to the output of the tunable optical filter for converting each wavelength channel into an electrical signal equivalent; and
   a processor component responsive to the electrical signal equivalent for extracting optical characteristic data therefrom for monitoring the performance of the selected optical signal applied as an input to the tunable optical filter, the processor component further configured to generate a first control signal applied as an input to the multiport switch to control the input port selection, and a second control signal applied as an input to the tunable optical filter to control the wavelength channel selection, the processor generating an attenuation mode as the first control signal when requesting the tunable optical filter to provide a predefined detuning from the value of the selected optical signal, reducing the optical power present in the selected optical signal, the processor component further configured to transmit a "disconnect" control signal to the multiport optical switch so as to remove all optical signal component inputs to the tunable filter and create a baseline noise measurement for use as a correction factor in characterization of further optical measurements, including an amount of attenuation provided for a predetermined detuning value.

2. The optical channel monitoring system as defined in claim 1 wherein the processor component further comprises a control unit for generating the first and second control signals and for determining conditions requiring the attenuation mode of the first control signal, including a defined decrease in power level.

3. The optical channel monitoring system as defined in claim 2 wherein the control unit is configured to simultaneously control the multiport optical switch and the tunable optical filter.

4. The optical channel monitoring system as defined in claim 1 wherein the system further comprises
   a reference wavelength source coupled to an input port of the multiport optical switch, the reference wavelength source activated by a separate control signal from the processor component, wherein upon being activated the reference wavelength source provides an optical signal at a known wavelength value as an input to the system, allowing for the system to perform a self-recalibration to correct for any discrepancies between the known wavelength value and a measured value received at the signal processor.

5. The optical channel monitoring system as defined in claim 1 wherein the processor component is configured to monitor received optical power and utilize the control signal input to the multiport optical switch to adjust optical alignment within the multiport optical switch and optimize optical output power therefrom.

6. A method of controlling an optical channel monitoring process in a multiport environment, the method including the steps of:
   a) providing a multiport optical switch at an input of an optical channel monitor, the multiport optical switch including a plurality of input ports for receiving a plurality of different optical signals and a single output port, and the optical channel monitor including a tunable optical fiber and a processor providing a port selection control signal and a wavelength selection control signal;
   b) transmitting a port selection control signal from the processor to the multiport optical switch to couple a selected input port to the output port, wherein if the port selection control signal includes an attenuation mode, applying detuning of a predetermined amount to the signal at the selected input port to create an attenuated input signal;
   c) applying the attenuated optical signal to the input of the optical channel monitor;
   d) transmitting a wavelength selection control signal from the processor to the tunable optical filter to select a specific center wavelength channel for measurement within the optical channel monitor;
   e) measuring optical power at the selected center wavelength within the selected optical signal;
   f) utilizing the wavelength selection control signal from the processor, repeating steps d) and e) to measure optical power at a set of wavelength channels within the selected optical signal;
   g) utilizing the port selection control signal from the processor, generating the multiport optical switch to couple a different input port to the output port, including detuning the connection between the input and output ports to provide a desired amount of signal attenuation;
   h) repeating steps b)-g)for one or more input ports of the multiport optical switch;
   i) disconnecting all input ports from the output port in response to a disconnect port selection control signal from the processor;
   j) measuring optical power at the output of the tunable optical filter in the absence of any input optical signal;
   k) defining the optical power measured in step j) as a baseline noise signal; and
   l) subtracting the baseline noise signal from measurements made in step e).

7. The method as defined in claim 6 wherein the method further includes a self-recalibration process and comprises the additional steps of:
   applying an optical reference signal exhibiting a known wavelength at an input port of the multiport optical switch;
   measuring optical power at the output of the tunable optical filter;
   comparing to known optical reference signal; and recalibrating the optical channel monitor to correct for differences between the measured values and known reference values.

8. The method as defined in claim 6 wherein the method further includes an optical power self-recalibration process and comprises the additional steps of:
measuring optical power at the output of the tunable optical filter for a given input port setting of the multiport optical switch;
comparing the optical power to previous measurements at the same optical input port setting; and
recalibrating the multiport optical switch portion of the optical channel monitor to maximize the measured optical power for a given input port by adjusting the optical alignment between the given input port and the output port of the multiport optical switch.

9. The method as defined in claim 6 wherein the method further includes an optical power self-recalibration process and comprises the additional steps of:
measuring optical power at the output of the tunable optical filter for a given input port setting of the multiport optical switch;
comparing the optical power to previous measurements at the same optical input port setting; and
recalibrating the tunable optical filter portion of the optical channel monitor to maximize the measured optical power by adjusting the optical alignment within the filter to maximum optical coupling efficiency between the filter input and the filter output.

10. The method as defined in claim 6 wherein in performing step d), a selected center wavelength is measured for an extended period of time, dwelling on a selected center wavelength.

11. The method as defined in claim 6 wherein in performing step d), a selected center wavelength is scanned across a wavelength range.

* * * * *